(12) United States Patent
Szadkowski et al.

(10) Patent No.: US 6,360,862 B1
(45) Date of Patent: Mar. 26, 2002

(54) CLUTCH STRAP

(75) Inventors: Andrzej Szadkowski; Eric Frandsen; Ronald Morford, all of Southern Pines, NC (US)

(73) Assignee: ZF Meritor, LLC, Maxton, NC (US)

( * ) Notice: Subject to any disclaimer, the term of this patent is extended or adjusted under 35 U.S.C. 154(b) by 0 days.

(21) Appl. No.: 09/503,221

(22) Filed: Feb. 11, 2000

(51) Int. Cl.⁷ .............................................. F16D 13/50
(52) U.S. Cl. ................... 192/70.18; 192/30 V
(58) Field of Search .................... 192/70.18, 70.17, 192/70.28, 30 V, 200

(56) References Cited

U.S. PATENT DOCUMENTS

| | | | |
|---|---|---|---|
| 3,167,163 A | * 1/1965 | Smirl et al. | 192/70.18 |
| 3,213,991 A | * 10/1965 | Smirl et al. | 192/70.18 X |
| 3,695,404 A | * 10/1972 | Maucher et al. | 192/70.18 |
| 4,790,419 A | * 12/1988 | Loizeau | 192/70.18 |
| 5,509,518 A | * 4/1996 | Zelikov | 192/70.18 X |
| 5,826,690 A | * 10/1998 | Maingaud et al. | 192/70.18 X |
| 6,123,177 A | * 9/2000 | Arhab | 192/70.18 X |

FOREIGN PATENT DOCUMENTS

| | | | |
|---|---|---|---|
| DE | 34 22 019 | * 12/1985 | 192/70.18 |
| GB | 2 151 315 | * 7/1985 | 192/70.18 |

* cited by examiner

*Primary Examiner*—Rodney H. Bonck
(74) *Attorney, Agent, or Firm*—Carlson, Gaskey & Olds

(57) ABSTRACT

A clutch assembly for a vehicle including a clutch cover rotatable about an axis is provided. A pressure plate is also rotatable about the axis and is movable along the axis relative to the clutch cover between engaged and disengaged positions. A resilient clutch strap secures the clutch cover and pressure plate together so that they rotate together about the axis. The strap is spaced apart from and transverse to the axis. As the pressure plate moves between engaged and disengaged positions, the resilient clutch strap flexes. The resilient clutch strap has first and second opposing ends secured to the clutch cover and pressure plate, respectively, at first and second connections, respectively. The first connection defines a first plane perpendicular to the axis, and the second connection defines a second plane perpendicular to the axis. The resilient clutch strap includes a disengaged state in which the first and second planes are generally coplanar in the disengaged position thereby reducing vibration.

3 Claims, 2 Drawing Sheets

CLUTCH STRAP

BACKGROUND OF THE INVENTION

This invention relates to clutch straps for a vehicle clutch assembly, and more specifically, the invention relates to an improved clutch strap design to reduce vibrations when the clutch is disengaged.

Vehicle clutch assemblies are used to break torque between an engine and transmission so that the driver may shift between transmission gears. The clutch assembly includes a clutch cover and pressure plate that moves relative to the clutch cover between engaged and disengaged positions. The engine drivingly rotates the clutch cover and pressure plate together about an axis. The pressure plate is normally in the engaged position in which the engine and transmission are coupled together. When the driver actuates a clutch pedal, the pressure plate is moved to the disengaged position. Resilient clutch straps secure the pressure plate to the clutch cover to transmit torque from the clutch cover to the pressure plate and allow axial movement between them. Typically, the clutch straps are spaced from and transverse to the axis near an outer perimeter of the pressure plate. The clutch straps flex as the pressure plate moves between the engaged and disengaged positions.

The clutch straps have opposing ends that are connected to the clutch cover and pressure plate. In the prior art, the clutch straps are straight in a free state and are bent in the disengaged and engaged positions so that the clutch straps ends are spaced from one another. Said another way, the ends are in planes perpendicular to the axis, which are offset from one another. Because of the rotation of the clutch cover and the pressure plate, moments are generated at the ends, which in the presence of torsional vibrations cause axial vibrations. These vibrations may cause misadjustments in self-adjusting clutches that may compromise the operation of the clutch. Therefore, what is needed is an improved clutch strap design that minimizes axial vibrations and misadjustments caused by the rotation of the clutch cover and pressure plate.

SUMMARY OF THE INVENTION AND ADVANTAGES

The present invention provides a clutch assembly for a vehicle including a clutch cover rotatable about an axis. A pressure plate is also rotatable about the axis and is movable along the axis relative to the clutch cover between engaged and disengaged positions. A resilient clutch strap secures the clutch cover and pressure plate together so that they rotate together about the axis. The strap transmits torque from the clutch cover to the pressure plate and allows axial movement between them. The strap is spaced apart from and transverse to the axis. As the pressure plate moves between engaged and disengaged positions, the resilient clutch strap flexes. The resilient clutch strap has first and second opposing ends secured to the clutch cover and pressure plate, respectively, at first and second connections, respectively. The first connection defines a first plane perpendicular to the axis, and the second connection defines a second plane perpendicular to the axis. The resilient clutch strap includes a disengaged state in which the first and second planes are generally coplanar in the disengaged position.

Accordingly, the above invention provides an improved clutch strap design that minimizes axial vibrations and misadjustments caused by the torsional vibrations from rotation of the clutch cover and pressure plate.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
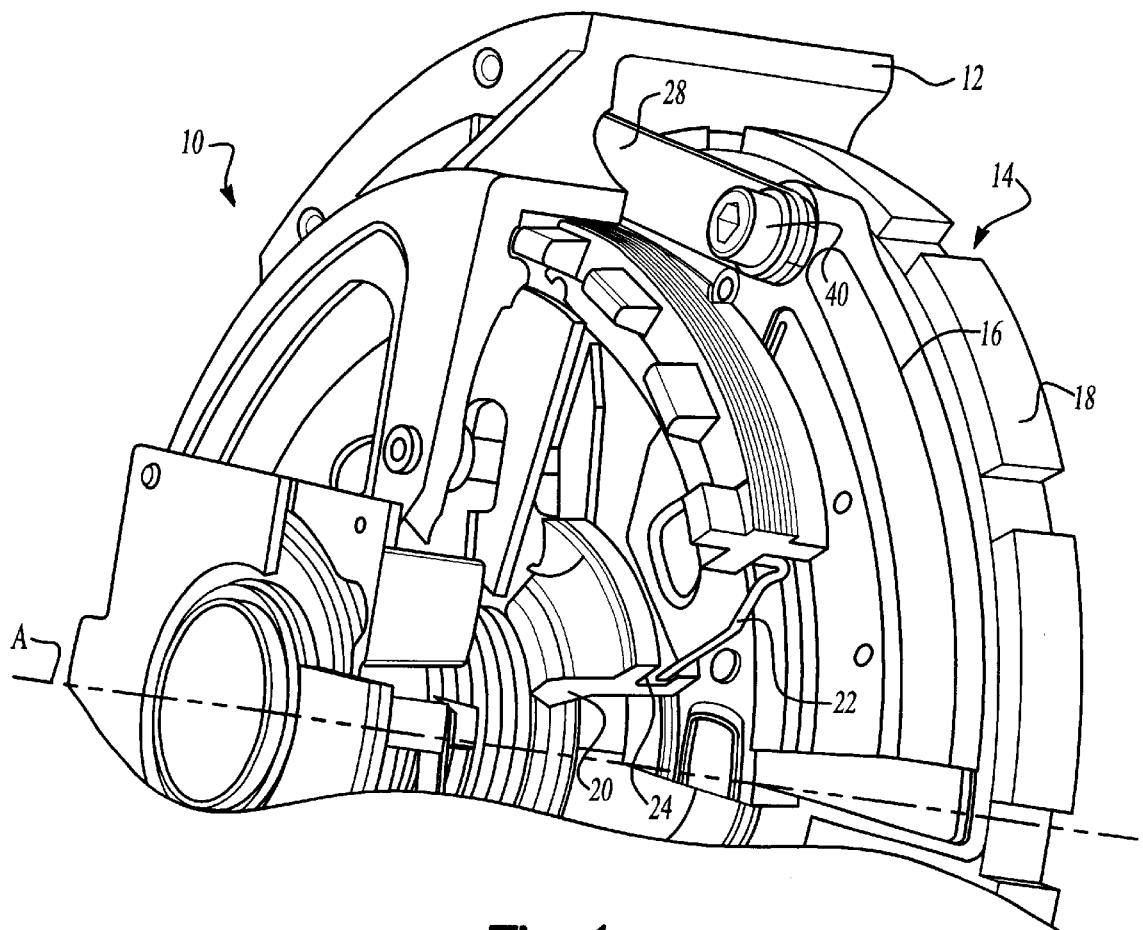
FIG. 1 is a partially broken perspective view of a clutch assembly with the present invention clutch strap.

Referring to FIG. 1, a clutch assembly 10 for a vehicle includes a clutch cover 12 rotatable about an axis A. A pressure plate 14 is also rotatable about the axis A and is movable along the axis A relative to the clutch cover 12 between engaged and disengaged positions. The pressure plate 14 may include a fulcrum ring 16 that is movable relative to a plate 18 for making adjustment to accommodate wear within the clutch assembly 10. A bearing 20 is connected to a clutch pedal for moving the pressure plate 14 between the engaged and disengaged positions. A lever 22 is received within a groove 24 in the bearing 20 and engages the fulcrum ring 16. The lever 22 biases the pressure plate 14 into a normally engaged position in which the pressure plate 14 coacts with a friction element. When the clutch pedal is actuated, the bearing 20 slides along axis A away from the pressure plate 14 so that the pressure plate 14 may move to the disengaged position.

A plurality of resilient clutch straps 28 secure the clutch cover 12 and pressure plate 14 together so that they rotate together about the axis A. The clutch straps 28 transmit torque from the clutch cover 12 to the pressure plate 14. Moreover, the clutch straps 28 retract the pressure plate 14 to the disengaged position when the clutch pedal is actuated. As the pressure plate 14 moves between engaged and disengaged positions, the resilient clutch strap 28 flexes. Each strap 28 is spaced apart from and transverse to the axis A. The resilient clutch strap 28 has first 30 and second 32 opposing ends secured to the clutch cover 12 and pressure plate 14, respectively, at first 34 and second 36 connections, respectively. An aperture 38 for receiving fasteners 40 defines each of the first 34 and the second 36 connections.

Clutch straps have a preassembled or free state prior to installation of straps into the clutch assembly, an engaged state in which the straps are deflected to enable the pressure plate to coact with a friction element, and a disengaged state in which the straps retract the pressure plate from the friction element when the clutch pedal is actuated.

Figure 2A:
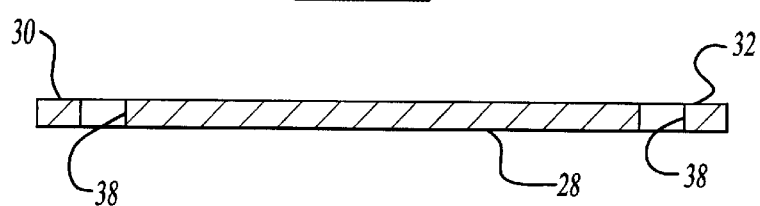
FIG. 2A is a cross-sectional view of a prior art clutch strap in a preassembled state.
Figure 2B:
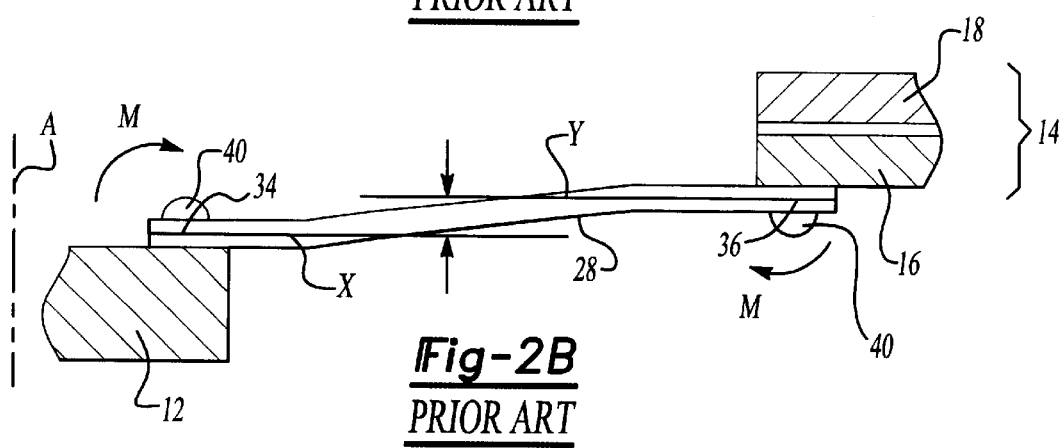
FIG. 2B is side elevational view of the prior art clutch strap of FIG. 2A in a disengaged state.

Prior art clutch straps 28 are typically stamped from metal and are flat in the preassembled state, shown in FIG. 2A. The straps 28 become bent, or slightly flex, once installed in the clutch assembly 10 due to the spring force that the lever 22 exerts against the pressure plate 14 to bias the pressure plate 14 in the normally engaged position. When the clutch pedal is actuated, the biasing force of the lever 22 is reduced to permit the straps 28 to retract the pressure plate 14 from the friction element. However, the strap 28 still remains slightly bent in the disengaged state, as shown in FIG. 2B. As a result, the connection points 34, 36 lie in two different planes X, Y that are offset from one another. This offset creates moments M at the connection points 34, 36 due to the rotation of the clutch cover 12 and pressure plate 14. The moments M cause the pressure plate 14 to vibrate along axis A, which may result in misadjustments in self-adjusting clutches.

Figure 3A:
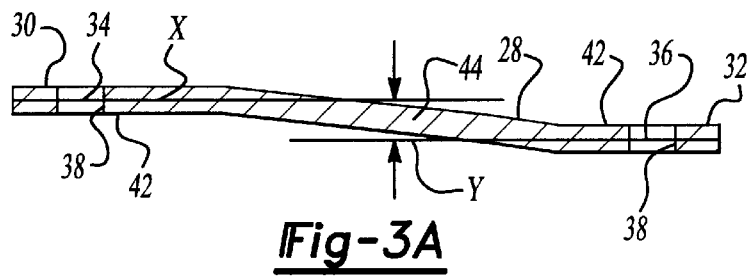
FIG. 3A is a cross-sectional view of the present invention clutch strap in the preassembled state.
Figure 3B:
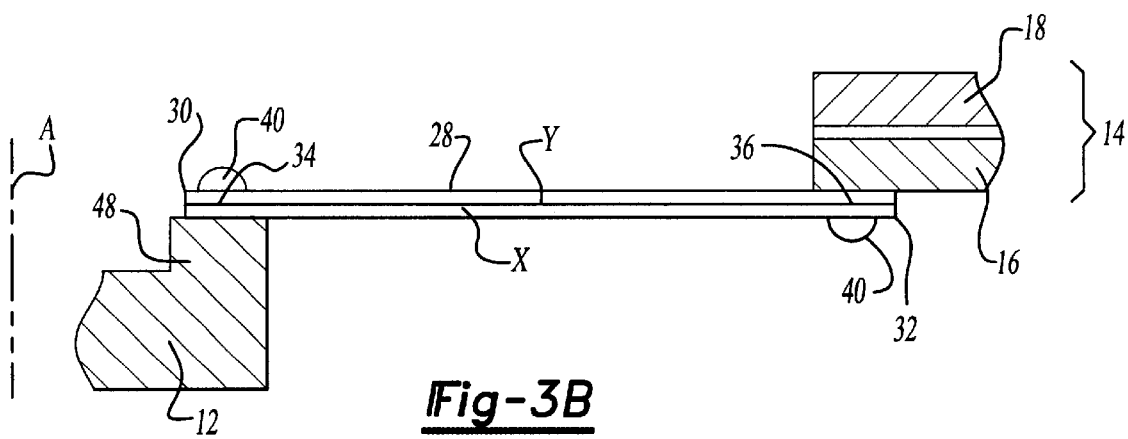
FIG. 3B is a side elevational view of the clutch strap of FIG. 3A in the disengaged state.
Figure 3C:
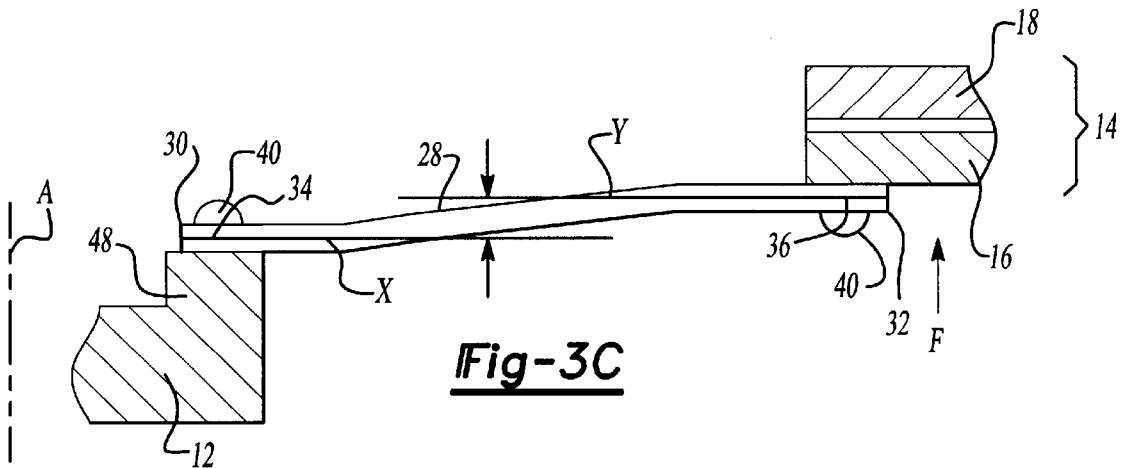
FIG. 3C is a side elevational view of the clutch strap of FIG. 3A in an engaged state.

The present invention eliminates the axial vibrations caused by prior art straps by eliminating the moments M. The same reference numerals will be used for similar features of the clutch strap 28. Referring to FIGS. 3A–3C, the first connection 34 defines a first plane X perpendicular to the axis A, and the second connection 36 defines a second plane Y perpendicular to the axis A. The first 30 and the second 32 opposing ends each have flat portions 42 parallel with one another in the preassembled state (FIG. 3A) and an angled portion 44 connecting the flat portions 42.

The resilient clutch straps 28 of the present invention include a disengaged state, shown in FIG. 3B, in which the first X and second Y planes are generally coplanar in the disengaged position. A boss 48 may be incorporated into the clutch cover 12 to achieve the proper alignment of the connections 34, 36. In this manner, moments are not created at the first 34 and second 36 connections by the rotation of the clutch cover 12 and pressure plate 14. The strap 28 must be bent in the preassembled state so that the straps 28 will retract the pressure plate 14 when the clutch pedal is actuated. Preferably, the resilient clutch strap 28 is generally flat, or straight between the first 34 and second 36 connections in the disengaged position. However, the strap 28 may have a vibration absorbing structure between the first 34 and second 36 connections, such as sinusoidal bends.

FIG. 3C depicts the strap 28 in the engaged state when the lever 22 generates a biasing force F which urges the pressure plate 14 into engagement with the friction element. In the engaged state, the first plane X is offset from the second plane Y in a direction opposite from that of the preassembled state.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A clutch assembly for a vehicle comprising:

a clutch cover rotatable about an axis;

a pressure plate rotatable about said axis, said pressure plate movable along said axis relative to said clutch cover between engaged and disengaged positions;

a resilient clutch strap having first and second opposing ends secured to said clutch cover and pressure plate respectively at first and second connections respectively, said first connection defining a first plane perpendicular to said axis and said second connection defining a second plane perpendicular to said axis, wherein said resilient clutch strap includes a disengaged state in which said first and second planes are generally coplanar in said disengaged position, wherein said resilient clutch strap includes an engaged state in which said first plane is offset from said second plane in a first direction in said engaged position, and wherein said resilient clutch strap is biased from a preassembled state in which said first plane is offset from said second plane in a second direction opposite said first direction to said engaged state upon assembly of said clutch assembly.

2. The assembly as set forth in claim 1, wherein said first and said second opposing ends each have flat portions parallel with one another in said preassembled state and an angled portion connecting said flat portions.

3. A clutch assembly for a vehicle comprising:

a clutch cover rotatable about an axis;

a pressure plate rotatable about said axis, said pressure plate movable along said axis relative to said clutch cover between engaged and disengaged positions;

a resilient clutch strap having first and second opposing ends secured to said clutch cover and pressure plate respectively at first and second connections respectively, said first connection defining a first plane perpendicular to said axis and said second connection defining a second plane perpendicular to said axis, wherein said resilient clutch strap includes a disengaged state in which said first and second planes are generally coplanar in said disengaged position, wherein said pressure plate includes a fulcrum ring and said second opposing end is secured to said fulcrum ring.

\* \* \* \* \*